(12) United States Patent  
Hirayama et al.

(10) Patent No.: US 7,168,351 B2  
(45) Date of Patent: Jan. 30, 2007

(54) HIGH-SPEED CUTTING PROCESS FOR GENERATING DESIRED CURVED SURFACE ON WORKPIECE

(75) Inventors: Shinobu Hirayama, Fukuoka-ken (JP); Toshiro Morikawa, Fukuoka-ken (JP); Masahiro Minohara, Fukuoka-ken (JP); Kouki Shingai, Fukuoka-ken (JP)

(73) Assignee: Seibu Electric & Machinery Co., Ltd., Fukuoka-Ken (JP)

( * ) Notice: Subject to any disclaimer, the term of this patent is extended or adjusted under 35 U.S.C. 154(b) by 0 days.

(21) Appl. No.: 10/822,681

(22) Filed: Apr. 13, 2004

(65) Prior Publication Data

US 2005/0005744 A1    Jan. 13, 2005

(30) Foreign Application Priority Data

Jul. 11, 2003    (JP)    ............................. 2003-195569

(51) Int. Cl.  
    *B23B 3/00*    (2006.01)
(52) U.S. Cl. .............................. 82/1.11; 82/118; 82/133
(58) Field of Classification Search ................ 82/1.11, 82/118, 119, 132–4, 137, 142, 905; 700/187, 700/188  
See application file for complete search history.

(56) References Cited

U.S. PATENT DOCUMENTS 4,893,971 A * 1/1990 Watanabe et al. ............. 409/80
5,329,457 A * 7/1994 Hemmerle et al. ......... 700/193
6,558,586 B1   5/2003 Padiou et al.
6,568,990 B1 * 5/2003 Siders et al. .................... 451/5

FOREIGN PATENT DOCUMENTS

| JP | 7-141004 | 6/1995 |
| JP | 11-309602 | 11/1999 |
| JP | 11-309602 A | 11/1999 |
| JP | 2002-126907 | 5/2002 |
| JP | 2002-126907 A | 5/2002 |
| JP | 2003-094201 | 4/2003 |

OTHER PUBLICATIONS

English Translation of JP 2002-126907.*

* cited by examiner

*Primary Examiner*—Monica Carter  
*Assistant Examiner*—Sara Addisu  
(74) *Attorney, Agent, or Firm*—Browdy and Neimark, PLLC

(57) ABSTRACT

A process for generating a curved surface on a workpiece with high speed is disclosed, in which an acceleration of a slider is set to a predetermined desired acceleration while a rotating velocity of a work spindle is made varied to keep the acceleration of the slider as constant as possible. Rotation of the work spindle and movement of an X-axis table are made synchronized with the movement of the slider having the desired acceleration to generate a preselected desired curve on a surface of the workpiece, which lies in perpendicular to a Y-axis along which a cutting tool moves in and out, thereby shortening the cycle time it takes for the curve generation on the workpiece.

9 Claims, 6 Drawing Sheets

(A)

(B)

(C)

(A)

(B)

(C)

ing a process for generating
any desired surfaces on an object or workpiece with using a
numerical control processor, called herein NC processor.
More particularly it relates to a process for generating any
preselected specific surfaces including toric surfaces, and so
on with high speed or high efficiency on any workpiece such
as a plastic lens or the like, hereinafter at times referred to
as "high-speed curve-generating process".

HIGH-SPEED CUTTING PROCESS FOR GENERATING DESIRED CURVED SURFACE ON WORKPIECE

FIELD OF THE INVENTION

The present invention relates to a process for generating any desired surfaces on an object or workpiece with using a numerical control processor, called herein NC processor. More particularly it relates to a process for generating any preselected specific surfaces including toric surfaces, and so on with high speed or high efficiency on any workpiece such as a plastic lens or the like, hereinafter at times referred to as "high-speed curve-generating process".

BACKGROUND OF THE INVENTION

A variety of optical lenses has been conventionally assembled and used in different types of optical devices, information processors, and so on. The most familiar of the lenses has the symmetrical aspheric or nonspherical surface, which is made by polishing or lapping the surfaces of the cut or molded glass blank with the use of lapping of honing machines to the final form. Many types of the specific lapping machine have been heretofore developed to generate the symmetrical aspheric surface on the lens. Most prior lapping machines, nevertheless, are envisaged to remove any rough surfaces left on the lens to improve the surface finish. The lapping of the workpiece is a slow process because the slow rotating velocity of the workpiece. This means that the prior lapping machines are ready for finish processing, but seldom possible to generate the desired curvature of the surfaces on the lens.

There are conventionally known many methods of generating the asymmetrical aspheric surface with high speed or high efficiency on the workpiece, using the numerical control (NC) processor. An example of the method of forming the asymmetrical aspheric surface on the workpiece is disclosed, for example, in Japanese Patent Laid-Open No. 309602/1999, in which a Z-axis table having a headstock thereon is kept against movement while on a processing operation. A workpiece mounted in a chuck on a work spindle is driven with a spindle motor to rotate on an axis of the work spindle, while a slider having a cutting tool thereon moves in and out in a Z-axis direction under NC control. Moreover, an X-axis table supporting the slider thereon travels in a reciprocating manner in the Z-axis direction. Thus, the slider and the X-axis table are allowed to reciprocate in synchronized relation not only with one another but also with the turning of the workpiece.

Another NC processor with onboard linear motor to get the slider reciprocating in Y-axis direction is disclosed, for example in Japanese Patent Laid-Open No. 2002-126907. With the prior NC processor as recited earlier, the linear motor forces the slider lying on a turner base to move in and out in a Z-axis direction, making it possible to cut the workpiece with high speed and high acceleration. To this end, the prior NC processor is comprised of a slide block provided thereon with a guide rail joined to the turner base in a way extending in the Z-axis direction perpendicular to an X-axis direction, a slider having a cutting tool to move back and forth along the guide rail with high speed and high acceleration, and a driving means to force the slider to move in and out along the linear guide rail, the driving means being composed of magnetic windings and field magnets allowed to move relatively to the magnetic windings, either of the magnetic windings and the field magnets being installed in the slider and the other in the slide block. There is provided the combination of a linear scale and a sensor to monitor a travel amount of the slider relative to the linear guide rail.

A prediction learning control system for a learning control to regulate the NC processor is moreover known as disclosed, for example in Japanese Patent Laid-Open No. 141004/1995. There is disclosed the learning control system, which has m inputs where target command vectors, and output vectors and state vectors of controlled object are input at current time in a way getting output vectors of controlled object represented with state space representation to follow target command vectors of the same pattern repeated with a period L, and p outputs where the control input vectors are output to the controlled object. The prediction learning control system recited above includes means for deriving a deviation vector from the combination of the target command vector and the output vector, means for storing a constant matrix for learning control, and means for determining a control input vector at current time to get a preselected evaluation function least.

Another method of forming the asymmetrical aspheric surface on the workpiece is disclosed in, for example Japanese Patent Laid-Open No. 2003-94201. With the method of forming the asymmetrical aspheric surface cited just earlier, a cutting tool is forced to move relatively into a workpiece rotated with a turning spindle head, thereby generating a desired surface on the workpiece. At the same time, the workpiece is moved in synchronized relation with the worked location in a radial direction of the turning spindle within a plane perpendicular to the rotational axis thereof, while the cutting tool is also moved depending on the worked location, carrying out the generation of the asymmetrical aspheric surface on the workpiece.

In the generation of any curved surface on the workpiece, most grinding or lapping operations always cost plenty of time for making any desired surface on the workpiece and, therefore, it remains a major challenge to produce any specific surface on the workpiece with short time. To cope with this, there have been developed the machining operations using the NC processor as stated just earlier to generate the asymmetrical aspheric surface with short time on the workpiece. With the prior machining operation using the NC processor, nevertheless, largely cutting hours needed for machining operation could not be achieved as the work spindle was kept against reciprocating movement in the Z-axis direction during cutting operation on the workpiece.

With the conventional processes for forming the desired curved surfaces on the workpiece recited earlier, the revolutions of the work spindle is determined and kept constant on the basis of the top acceleration in reciprocating movement of the cutting tool forced to move in and out by means of the Y-axis driving means. It is principal technical concept in the conventional generating process for the desired surface to keep continuously the revolutions of the work spindle on which the workpiece is held constant. According to most prior generating processes for the desired surface on the workpiece, that is to say, the rotating velocity of the work spindle is kept at a predetermined rpm throughout the cutting operation on the workpiece, which is determined in light of acceleration in the Y-axis reciprocating movement of the slider on which the cutting tool is clamped. This has been a major factor in substantial cycle time being needed for forming the desired surface on the workpiece. Momentum of the slider in Y-axis direction is less at the central area than at the peripheral area of the workpiece and yet the rotating velocity of the work spindle is set on the basis of the periphery of the workpiece without controlled to make any change. Getting the slider moving with the top acceleration in the Y-axis direction, thus, was realized at only the peripheral area of the workpiece and, therefore, no prior generating process for the curved surface on the workpiece could make the most of the high acceleration performance.

In the process for generating any curved surface on the workpiece including a thin lens such as spectacles, and so on, typically, the greater a travel amount of the slider in the Y-axis direction is the greatest at the time when any surface of the workpiece is generated into the curved surface by a circumferential fringe of the workpiece, and gets less as the cutting operation proceeds away from the circumferential fringe toward the center of the workpiece. Procedure to generate the curved surface on the workpiece such as lens and so on heads away from the circumferential fringe region larger in diameter towards the central region smaller in diameter of the workpiece. The movement of the slider in the X-axis direction carries out shifting the region where the desired curvature of surface is made on the workpiece from the radial outside inward. With the prior processes for generating any curved surface on the workpiece, moreover, the rotational frequency of the work spindle is selected in such a manner that the acceleration in Y-axis direction of the slider at the circumferential fringe of the workpiece is not more than the top acceleration that would be determined under the conditions of machine construction and performance. The work spindle is driven at the preselected number of revolution, which is kept constant throughout the generating process for the curved surface on the workpiece. The reason for keeping the rotational frequency of the work spindle constant throughout the generating procedure is that the prior process for generating the curved surface on the workpiece works under the learning control that adopts a time length as the period of learning control, necessitating keeping the time length per one revolution (360°) of the work spindle constant. In manufacture of, for example the thin lens such as spectacles in such a way proceeding the cutting operation away from the circumferential fringe toward the center of the workpiece, with using the prior generating process for the curved surface working on the basic principle of operation as stated just earlier, while the rotating frequency of the work spindle, or the time length per one revolution of the work spindle, is kept continuously constant throughout generating procedure for the curved surface, the travel amount in the Y axis of the slider on which the cutting tool is mounted gets less as the cutting operation proceeds away from the circumferential fringe toward the center of the lens. Thus, the acceleration in the Y axis would get less as the cutting operation proceeds away from the circumferential fringe toward the center of the lens.

With the curve generator in which a lead turner having a slider is onboard an X-axis table, on the other hand, the slider is so constructed as to move in the Y-axis direction with high speed and high acceleration during the curve-generating operation on the workpiece. With the prior generating process for the curved surface in which the Y-axis acceleration of the slider gets less as the cutting operation proceeds away from the fringe toward the center of the workpiece, accordingly, it could be said that the slider could not serve the high performance in the Y-axis movement of the slider to the full. Thus, the process for generating the curved surface on the workpiece still poses the major challenge about how to make the most of the Y-axis acceleration performance of the slider to shorten the time cycle it takes for the curve generation on the workpiece.

SUMMARY OF THE INVENTION

The present invention, therefore, has as its primary object to solve the major challenge as described just above and to provide a high-speed curve-generating process shortening a processing time it takes for generating any preselected curved surface on a workpiece, thereby cutting a cycle time to improve working efficiency to make the curved surface on the workpiece. More particularly, the present invention provides a process for generating a curve surface on a workpiece, in which a driving means to force a slider with onboard cutting tool to move in and out is not controlled by using a conventional pulse command in terms of time clock issued under the condition where the rotating velocity of the work spindle is kept constant, but relying instead on a pulse command in terms of angle period of rotating angle of the work spindle, which is turned with a rotational frequency regulated to keep the acceleration of the slider in reciprocation as constant as possible at an acceleration that is preselected to the top acceleration or any acceleration as high as possible below the top acceleration. With the curve generating process as recited just earlier, the rotational frequency of the work spindle is controlled so as to keep the acceleration, preferably the top acceleration of the slider as constant as possible during the cutting operation is carried out at or near the center of the workpiece while slow down when the cutting operation is carried out by the circumferential fringe of the work piece. Thus, the work spindle is driven with the rotating velocity incremental as the cutting operation proceeds away from the circumferential fringe toward the center of the workpiece.

A further another object of the present invention is to provide a high-speed curve-generating process suited well to cut a variety of any desired curvatures including a concave lens surface, convex lens surface, toric lens surface, progressive multifocal lens surface or the like on a workpiece such as a plastic lens blank and so on. The high-speed curve-generating process of the present invention is envisaged to have the Z-axis movement of the work spindle and the Y-axis movement of the slider synchronized with the rotation of the work spindle on which a workpiece of plastic lens, thereby shortening the stroke of the slider in Y-axis direction by an amount of the Z-axis movement of the work spindle, helping shrink the slider, rendering the inertia of the slider less to allow the slider making reciprocation with high-speed and high acceleration, thus helping generate precisely a preselected desired curve surface on the workpiece with a very short time by making the most of the high response performance of the linear motor.

The present invention is concerned with a process for generating with high speed a curved surface on a workpiece, using a numerical control (NC) processor comprising a work spindle to hold a workpiece thereon, the work spindle being supported for rotation on a headstock, a Z-axis table allowing the work spindle to move in reciprocation in a Z-axis direction, an X-axis table arranged in opposition to the work spindle in a way allowed to move in reciprocation in an X-axis direction perpendicular to the Z-axis direction, a turner base fastened to the X-axis table, a slider allowed to move back and forth over the turner base in a Y-axis direction parallel with the Z-axis direction, a cutting tool mounted to the slider, and a driving means to force the slider in reciprocation in the Y-axis direction; wherein an acceleration of the slider in reciprocation is set to a predetermined desired acceleration, a rotating velocity of the work spindle is so varied as to keep the predetermined desired acceleration as constant as possible, and movements of the slider in the Y-axis direction and the X-axis table in the X-axis direction are made synchronization with the varied rotating velocity of the work spindle, whereby the cutting tool generates a desired curved surface on a surface of the workpiece lying perpendicular to the Y-axis direction of the cutting tool.

In one aspect of the present invention, a process for generating with high speed a curved surface on a workpiece is disclosed in which the driving means is any one of a linear motor and a rotary servomotor. As for response performance and reciprocation speed of the driving means to force the slider with onboard cutting tool in reciprocation, the linear motor is far more significant than the rotary servomotor for shortening the time cycle it takes for the curve generation on the workpiece.

In another aspect of the present invention, a process for generating with high speed a curved surface on a workpiece is disclosed in which the predetermined acceleration of the slider in reciprocation is set to a top acceleration or less in reciprocation permitted to the slider. Moreover, there is disclosed a process for generating with high speed a curve surface on a workpiece, in which the rotating velocity of the work spindle is made varied to increase with any one of linear or any curve of second degree, third degree, forth degree and logarithmic function where changing rate of the rotating velocity of the work spindle is made optimal to keep the acceleration of the slider as constant as possible at the preselected acceleration.

In another aspect of the present invention, a process for generating with high speed a curved surface on a workpiece is disclosed in which the Z-axis table on which the work spindle is mounted is moved in the Z-axis direction throughout cutting operation with the cutting tool into the workpiece, and the movement of the Z-axis table in the Z-axis direction is made synchronized one another with the varied rotating velocity of the work spindle, the movement of the slider in the Y-axis direction and the movement of the X-axis table in the X-axis direction.

In another aspect of the present invention, a process for generating with high speed a curve surface on a workpiece is disclosed in which procedure to cut the desired curve surface on the workpiece is performed by making use of a prediction learning control and a learning control where angle pulses are used at repeated periods with taking into account instructions which are fed back repeatedly to the work spindle at every angular cycle.

In another aspect of the present invention, a process for generating with high speed a curved surface on a workpiece is disclosed in which a stroke of reciprocation in the Y-axis direction of the slider to which the cutting tool is mounted is set to a value found by taking away a stroke in Z-axis direction of the work spindle on which the workpiece is held, whereby the workpiece is cut into the desired curved surface. In an alternative where the Z-axis table is kept against the movement, the travel amount of the work spindle comes to zero.

In a further another aspect of the present invention, a process for generating with high speed a curved surface on a workpiece is disclosed in which the desired curved surface on the workpiece is a toric surface where a curvature in one meridian has a radius while another curvature in a perpendicular meridian has another radius, and in which a travel amount in the Z-axis direction of the work spindle on which the workpiece is held is set to a travel amount corresponding to the radius of curvature in one meridian while a travel amount in the Y-axis direction of the slider on which the cutting tool is mounted is set to a difference between a travel amount corresponding to the radius of curvature in the perpendicular meridian and a travel amount corresponding to the radius of curvature in the one meridian. As an alternative where the desired curved surface is a surface approximating to the toric surface, a travel amount in the Z-axis direction of the work spindle on which the workpiece is held is set to a travel amount corresponding to the radius of curvature in one meridian while a travel amount in the Y-axis direction of the slider on which the cutting tool is mounted is set to a total amount of a difference between a travel amount corresponding to the radius of curvature in the perpendicular meridian and a travel amount corresponding to the radius of curvature in the one meridian and its own distance from the initial position. In the operation the Z-axis table is kept against the movement, the travel amount in the Z-axis direction of the work spindle comes to zero, representing a sort of specific point.

In another aspect of the present invention, a process for generating with high speed a curve surface on a workpiece is disclosed in which the workpiece on which the desired curved surface is generated is a spectacle lens. In another aspect of the present invention, a process for generating with high speed a curve surface on a workpiece is disclosed in which the slider is set to make many times of reciprocation every one rotation of the work spindle. For example, the slider makes two times of reciprocation in case where the desired curved surface to be generated on the workpiece is the toric surface. For the generation of multifocal lens, how often the reciprocation of the slider makes is not determined. Instead, the frequency of reciprocation of the slider is set depending on the number of focus in the multifocal lens.

According to the present invention, there is provided a process for generating a curved surface on a workpiece, in which the slider is designed to make N times of reciprocation every one rotation of the work spindle. In a further another aspect of the present invention, the linear motor to force the slider to move in and out is comprised of a field magnet associated with any one of the slider and the turner base, and an armature winding associated with the other. In an additional aspect of the present invention, the turner base on which the linear motor is mounted is provided with a linear scale to monitoring a position of the turner base.

With the high-speed curve-generating process of the present invention achieved as stated earlier, the work spindle is controlled to vary the rotational frequency thereof so as to keep the acceleration in reciprocation of the slider as constant as possible, the acceleration having been set to the top acceleration or less permitted in the slider reciprocation. Thus, the high-speed curve-generating process of the present invention is more favorable in making the most of the functions of the driving means such as the linear motor, rotary servomotor and the like to actuate the slider, compared with the conventional curve-generating methods in which the rotating velocity of the work spindle is fixed constantly, thereby helping shorten largely the time cycle need for cutting the workpiece and improve the cutting efficiency to generate a lens surface on the work piece of, for example plastic lens.

Especially for generating the toric surface on the workpiece, using the cutting tool mounted on the slider in opposition to the workpiece, the Y-axis stroke in the direction, or Z-axis and Y-axis directions, perpendicular to the lens surface is equivalent to a travel amount needed to follow the curved surface to be cut on the workpiece. Now considering that the high-speed cure-generating process of the present invention is used to make any one surface on the workpiece into a toric surface where a curvature in one meridian has a radius RL while another curvature in the perpendicular meridian has a radius RS less than the RL. In the high-speed curve-generating process of the present invention achieved as stated earlier, since the slider is moved in the Y-axis direction while the work spindle is moved in the Z-axis direction in synchronized relation with the Y-axis movement of the slider, the slider has only to move by the difference between the travel amount RB corresponding to the radius RL of the curvature in the one meridian and the travel amount RC corresponding to the radius RS of the curvature in the perpendicular meridian: (RB−RC). As a result, the Y-axis stroke of the slider can be made less, compared with the prior method in which the rotating velocity of the work spindle is kept constant. This allows making the linear motor for the driving means to move the slider in the Y-axis direction smaller in construction by the shortened amount of stroke for the slider, making it possible to render the slider less in construction and also in mass. Because the acceleration of the moving parts is generally depending on their mass and the power of the linear motor to actuate the moving parts, the moving part or the slider weighing as less as possible results in increasing the acceleration of the slider, raising the top acceleration of the slider to make it possible to increasingly reduce the time cycle needed for processing the workpiece.

The high-speed curve-generating process of the present invention is preferably controlled with using the learning control system or the prediction learning control system in which the control commands are often fed back in a repeated manner to have any discrepancy between the control command and the actual amount of movement nearing the null state as closer as possible. The more often the control commands are repeated, the smaller the error in the final curved surface will be. Accordingly, the desired curvature is successfully generated with precision on the surface of the workpiece. That is to say, the high-speed, curve-generating process of the present invention features that the rotational frequency of the workpiece spindle is varied to keep the acceleration of the slider as constant as possible while the work spindle is controlled with the learning control function to get a difference between a rotational frequency command and an actual rotational frequency of the work spindle nearing a null state as closer as possible, the work spindle also moves in the Z-axis direction in synchronized relation with the controlled rotational frequency thereof while the cutting tool is forced in the Y-axis direction, and at the same time the turner base moves in the X-axis direction, whereby the desired curved surface, for example the toric surface is generated on the workpiece such as the lens blank and so on, and further control commands are often fed back in a repeated manner during the cutting tool moves across the associated surface of the workpiece in a spiral locus and thereby the difference between the control command and the actual movement is made infinitely less, so that the desired curved surface is generated accurately on the workpiece with high speed and also the time cycle it takes for the curve generation on the workpiece is shortened remarkably.

With the high-speed curve-generating process of the present invention as stated earlier, the rotating velocity of the work spindle is varied to keep the acceleration of the slider constant, which is forced with the driving means including the linear motor, rotary servomotor, and so on to move in and out in the Y-axis direction. The acceleration of the slider is set at any optimal acceleration during cutting procedure against the workpiece, for example at the top acceleration while the rotating velocity of the work spindle is controlled in such a way incremental as the cutting operation proceeds inwards toward the center of the workpiece, keeping the acceleration of the slider as constant as possible at the top acceleration lest the acceleration in the Y-axis direction of the slider, or the cutting tool, should lower, thereby cutting the cycle time it takes to finish the desired curved surface to a matter of 30% to 50%, helping increase the procedure efficiency to cut the workpiece. Further, when the high-speed curve-generating process of the present invention is needed to cut any unique surface area of distinctive surface precision and surface roughness on the workpiece, programming for procedure commands has to be only modified to regulate the infeed amount of the X-axis table to ensure the desired precision.

With the high-speed curve-generating process of the present invention, moreover, the stroke amount of the slider with onboard cutting tool is made shortened by the Z-axis travel of the work spindle on which the workpiece is held, and correspondingly the slider forced in reciprocation manner by the driving means including the linear motor, and so on can be made small in construction, thus less in mass. This makes ensure the slider moves in and out with high speed and high acceleration while the work spindle is varied in rotating velocity, with following the reciprocation of the slider. Thus, the slider can be driven with good response to the high speed and high acceleration, thereby making sure of generating accurately the desired curved surface such as toric surface and the like on the workpiece. Besides, when the moving component, or the slider, is forced to move with a fixed acceleration, the reaction force of the acceleration in general relies on the mass of the slider. Thus, how much the mass of the slider is contributes to some physical properties including stiffness, attenuation, mass, and so on of the fixed component including the turner base and the X-axis table mounted on the turner base, which is resistant against the reaction of the slider. The less the reaction force induced by the moving component is, the simpler or smaller the curve generator itself is made in construction. According to the present invention, thus, there is no need of making the curve generator itself large in mass thereof.

DETAILED DESCRIPTION OF THE PREFERRED EMBODIMENTS

Figure 1:
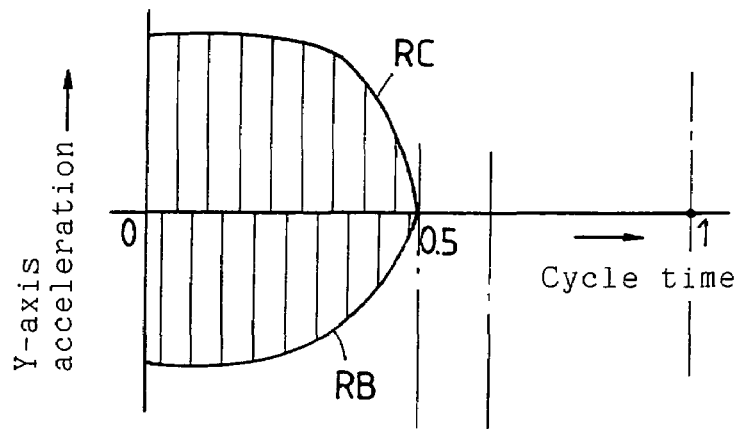
FIG. 1 is a graphic representation to help explain a cycle time for generating a curved surface on a workpiece according to the high-speed curve-generating process of the present invention, compared with the cycle time in the prior curve-generating process.
Figure 1:
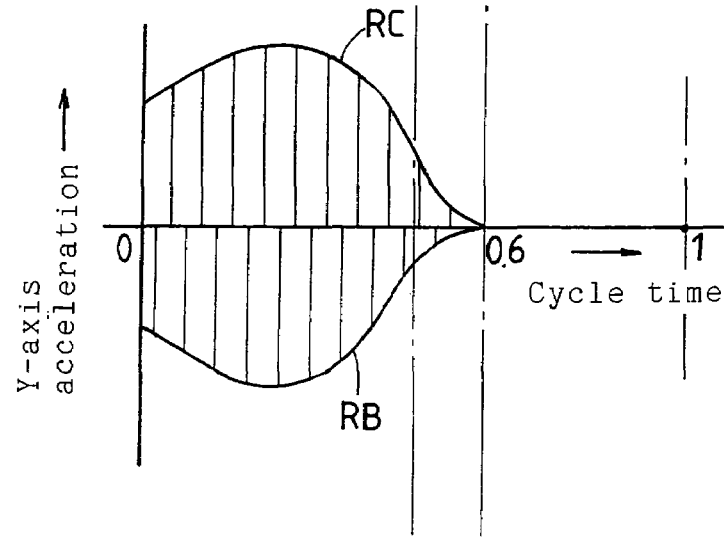
Figure 1:
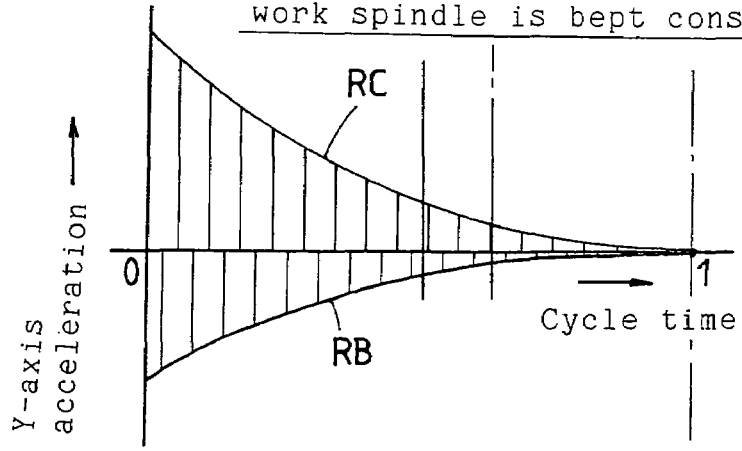
Figure 2:
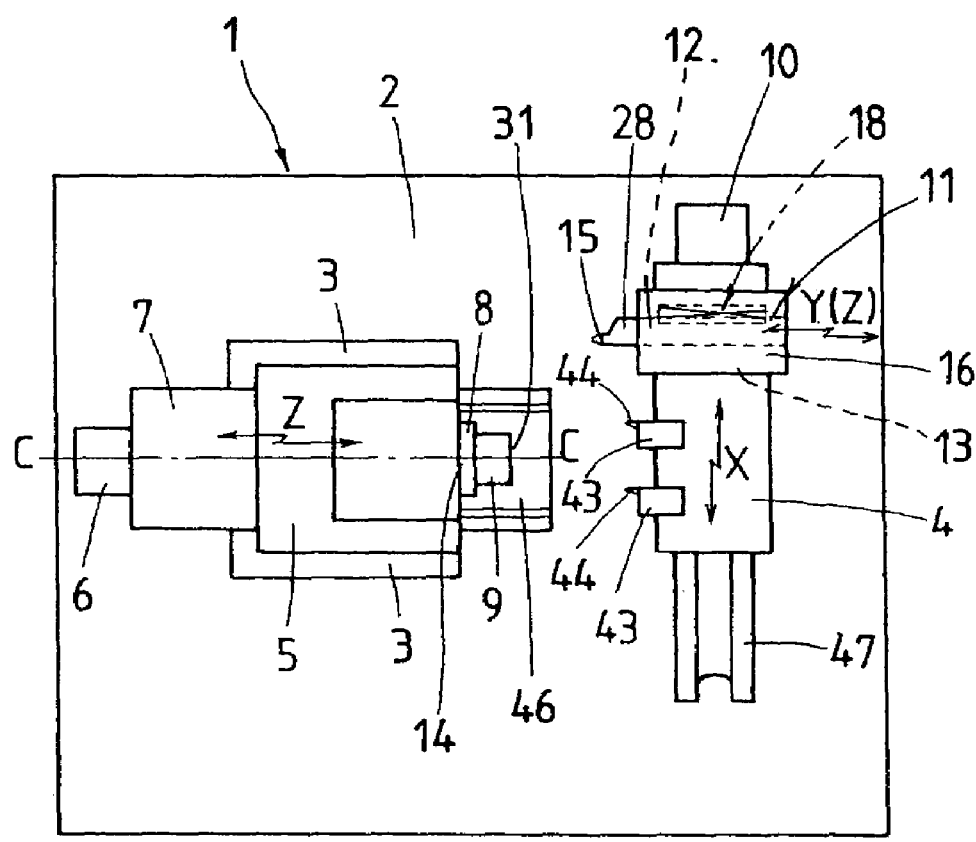
FIG. 2 is a schematic top plan view showing an NC curve generator to perform the high-speed curve-generating process of the present invention.
Figure 3:
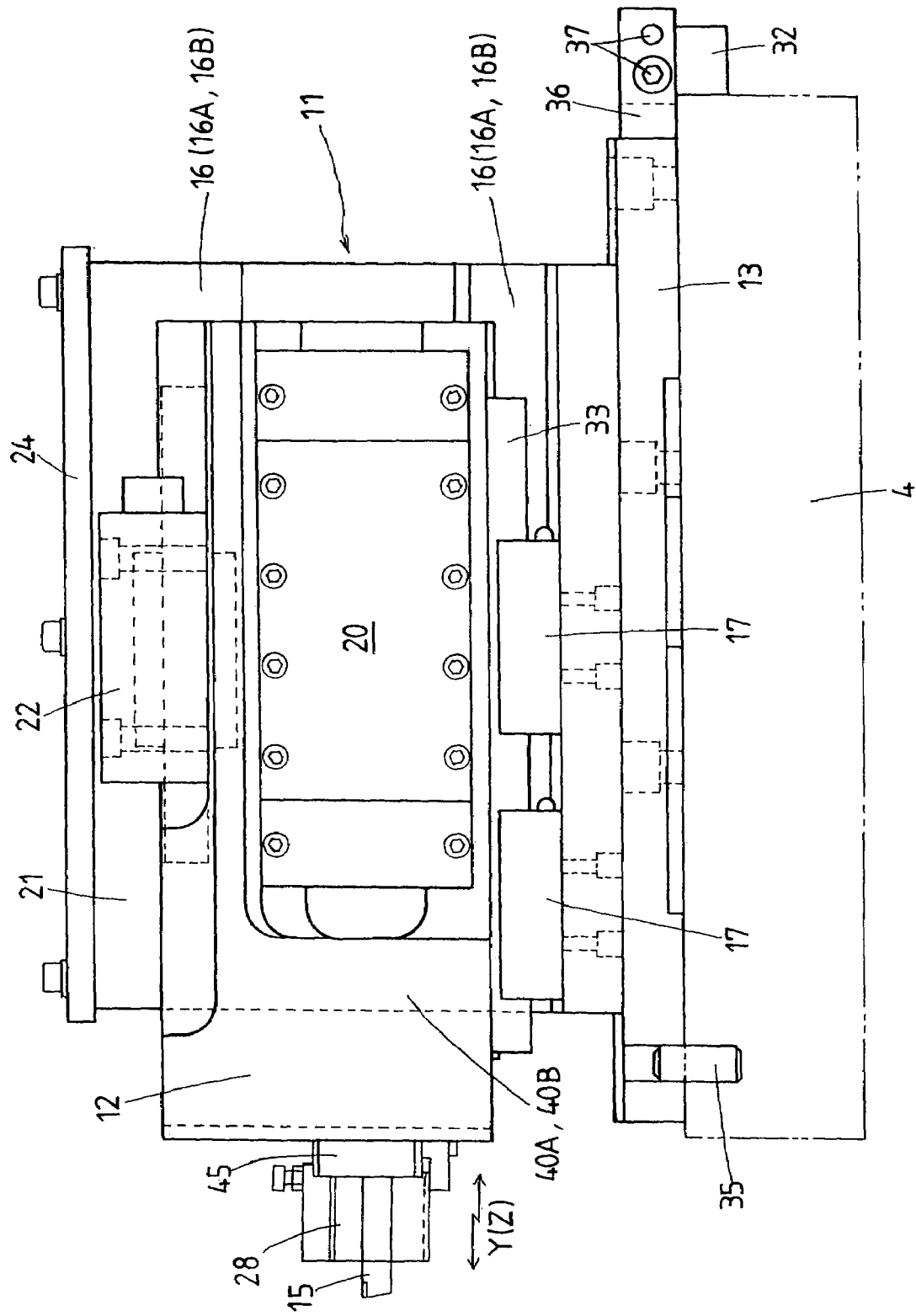
FIG. 3 is an elevation showing a turner in the NC curve generator of FIG. 2.
Figure 4:
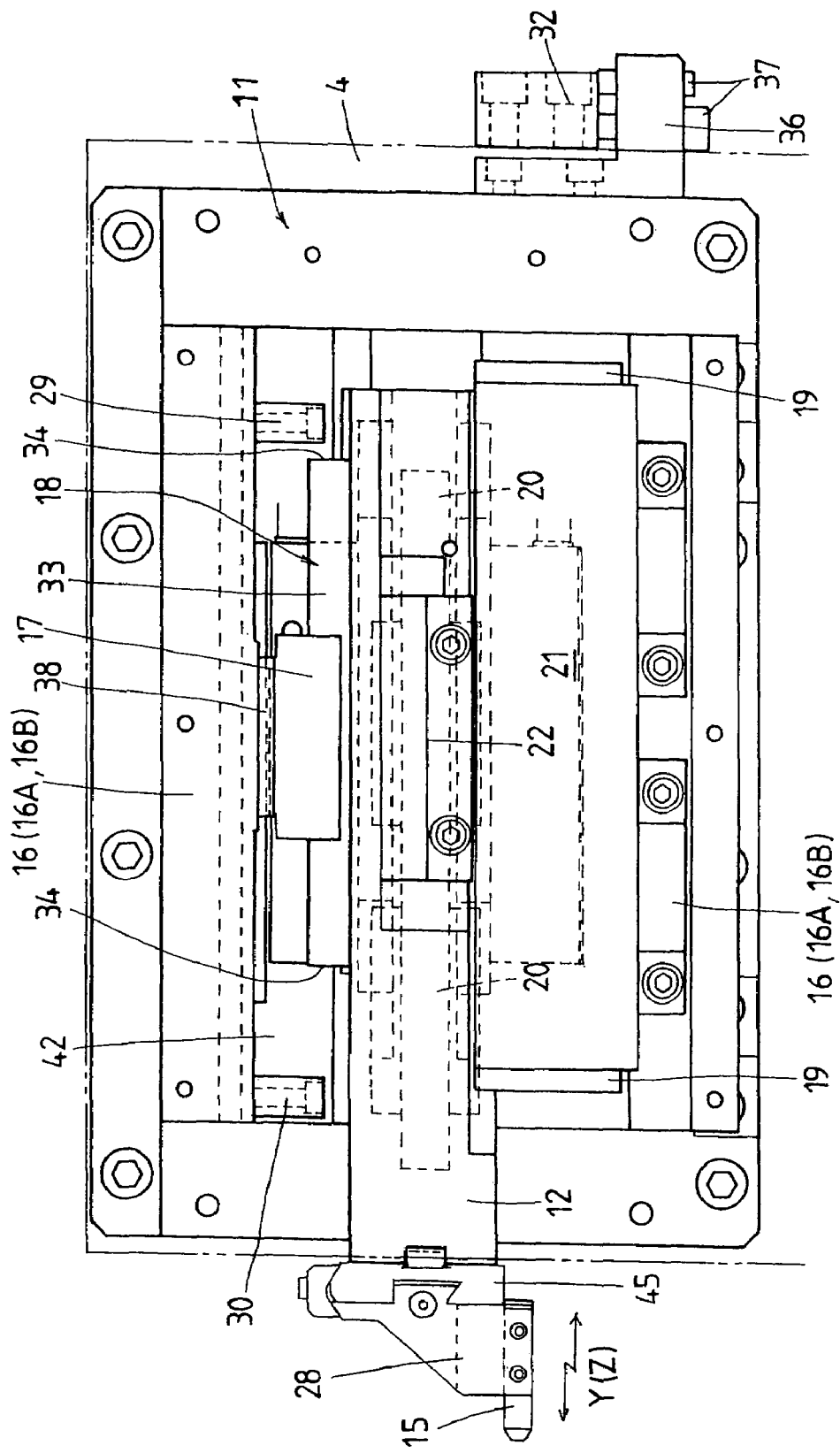
FIG. 4 is a top plan view of the turner in the NC curve generator of FIG. 2.
Figure 5:
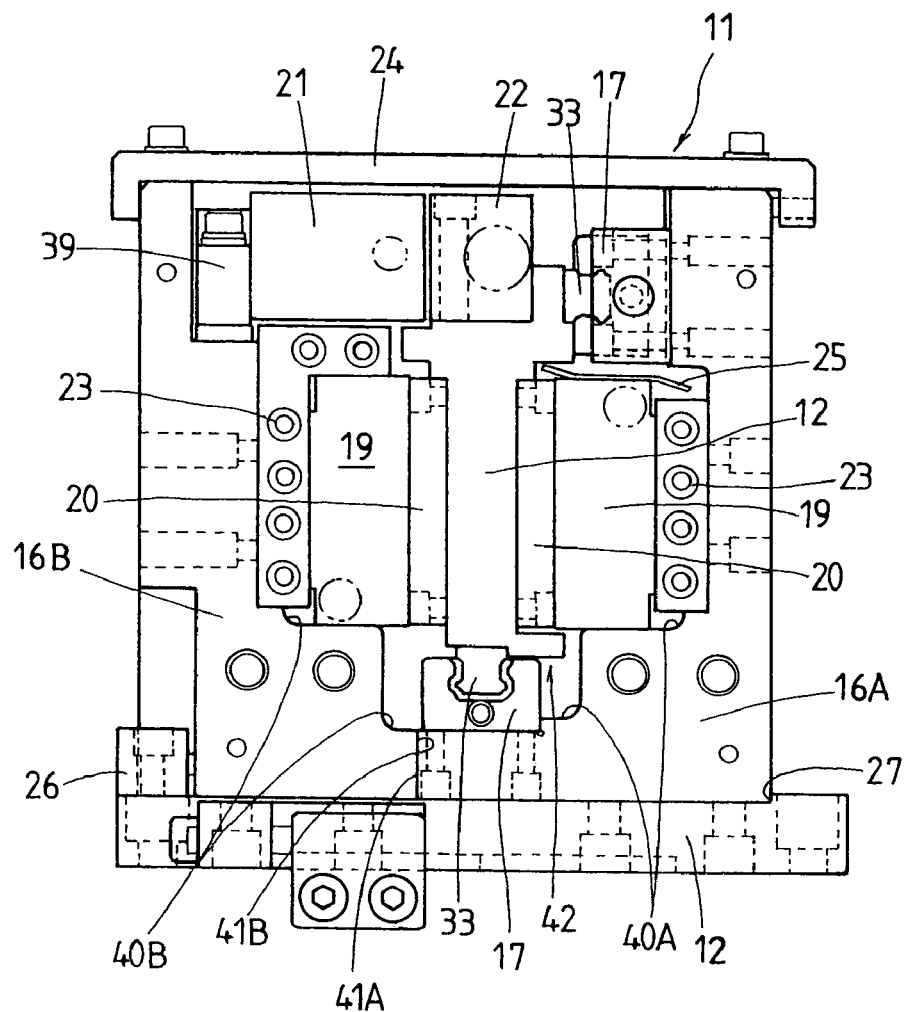
FIG. 5 is a side elevation of the turner in the NC curve generator of FIG. 2, but in which a cutting tool is removed.

A preferred embodiment of a process for generating any curved surface on a workpiece with high-speed according to the present invention will be explained hereinafter in detail with reference to the accompanying drawings. Referring first to FIGS. 2 to 5, there is an NC curve generator to carry out the high-speed curve-generating process according to the present invention.

A high-speed curve generator 1 to carry out the high-speed curve-generating process according to the present invention is comprised of a Z-axis table allowed to move in and out lengthwise of a work spindle 14 on a Z-axis base 46 mounted on a machine bed 2, and an X-axis table 4 allowed to make reciprocation move in an X-axis direction perpendicular to the Z-axis direction on an X-axis base 47 mounted on the machine bed 2. A headstock 5 is supported on the Z-axis table 3, which is forced to move in and out in the Z-axis direction by actuation of a servomotor 6 attached to the Z-axis base 46. The headstock 5 has an onboard spindle motor 7 to get the work spindle 14 turning. The headstock 5 is also provided at a tip thereof with a chuck to hold a workpiece 9. The X-axis table 4 allowed to move in and out in the X-axis direction perpendicular to the Z-axis direction of the Z-axis table 3 is located in opposition to the workpiece 9 held by the chuck 8 on the work spindle 14. On the X-axis table 4, a turner 11 is fastened either directly or through a tool carriage and also some tool carriages 43 are mounted to hold various cutting tools 44 in opposition to the work spindle 14.

The high-speed curve-generating process of the present invention is performed by making use of the NC curve generator 1, which is in general composed of the headstock 5 bearing thereon for rotation the work spindle 14 on which the workpiece 9 is held, the Z-axis table 3 to move in and out the work spindle 14 in the Z-axis direction, the X-axis table 4 lying in opposition to the workpiece 9 held on the work spindle 14 in a way moving in the X-axis direction perpendicular to the Z-axis direction, a turner base 16 lying on the X-axis table 4 for the provision of the turner 11, a slider 12 having at one end thereof a cutting tool 15 and allowed to move in and out in a Y-axis direction in line with the Z-axis direction on the turner base 16, and driving means including a linear motor 18, rotary servomotor, and so on to force the slider 12 to move in and out in the Y-axis direction.

With the high-speed curve-generating process of the present invention, the driving means to force the slider 12 with any cutting tool to move in and out is constituted, especially, with the linear motor 18. The process for generating any curved surface on the workpiece including a lens according to the present invention features that the slider 12 moving in and out is set to a preselected acceleration, kept constantly at a preselected acceleration while the work spindle 14 is varied in rotating velocity so as to keep the acceleration of the slider 12 constant at the preselected acceleration, and linear movements of the slider 12 in the Y-axis direction and the X-axis table 4 in the X-axis direction are both controlled to make mutual synchronization with the varied rotating velocity of the work spindle 14, whereby a surface 31 of the workpiece, or a lens in the embodiment discussed here, lying in perpendicular to the moving direction of the cutting tool 15 in the Y axis is machined making use of the cutting tool 15 into a desired curvature of the surface. The preselected acceleration of the slider 12 moving in and out is set not more than the top acceleration allowed for the reciprocating movement of the slider 12 under design considerations. Varying the rotating velocity of the work spindle 14 depending on the preselected acceleration of the slider 12 makes it possible to generate with high speed or efficiency the desired curved surface on the workpiece, resulting in reducing the time cycle needed for processing the workpiece. The greater the acceleration of the slider 12 is, the more the cycle time is shortened. Programming for the high-speed curve-generating process stated earlier, for example, may be made by indexing an X-axis location of the turner base 16 on the basis of both an curve showing the increase of the rotating velocity of the work spindle 14 and an infeed amount per every rotation in the X axis of the slider 12, and finding an amount of movement in the Y axis of the slider 12 to determine relative amounts of movement among each axis.

With the high-speed curve-generating process of the present invention, moreover, the Z-axis table 3 having thereon the work spindle 14 can be moved in the Z-axis direction while the workpiece 9 is machined with the cutting tool 15 in such a way that the Z-axis table movement makes synchronization with the varied rotating velocity of the work spindle 14, the Y-axis movement of the slider 12 and the X-axis movement of the X-axis table 4. As a result, the reciprocation of the slider 12 is made shorter in stroke, contributing to further reduction of the cycle time. As an alternative, the high-speed curve-generating process can machine the desired surface on the workpiece 9 in such an operation that while the Z-axis table 3 is kept against movement in the Z axis, the variable rotating velocity of the work spindle 14, the Y-axis movement of the 12 and the X-axis movement of the X-axis table 4 are controlled to come into synchronization with one another. The operation the Z-axis table 3 with the work spindle 14 is kept against the movement in the Z axis corresponds a sort of specific point where the travel amount of the work spindle 14 in the Z-axis direction comes to zero.

Figure 6:
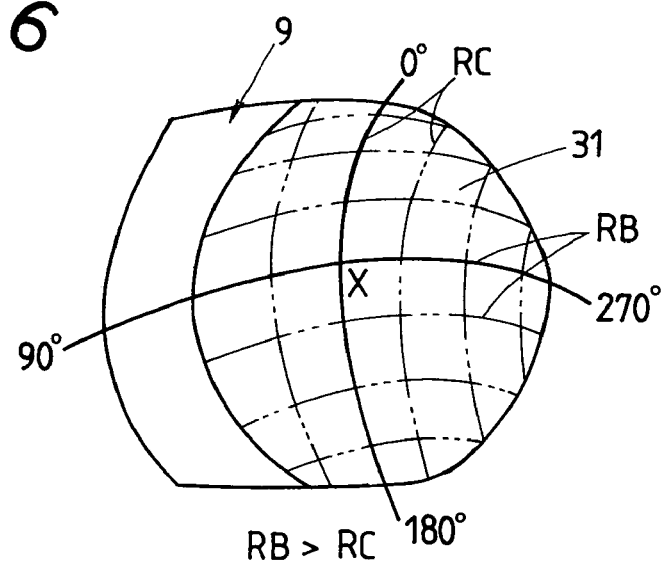
FIG. 6 is a perspective view of a toric lens, which is an example of the workpiece having any desired curvature of surfaces generated with the high-speed curve-generating process of the present invention.

Referring to FIG. 1, there are illustrated cycle times in the high-speed curve-generating process of the present invention, compared with the cycle time in the conventional curve-generating process. Now considering that the workpiece 9 is a thin lens made with a toric surface where a curvature in one meridian has a radius RL while another curvature in the perpendicular meridian has a radius RS less than the RL: RL>RS as shown in FIG. 6. In FIG. 1, an abscissa is referred to the cycle time while an ordinate is the Y-axis acceleration. FIG. 1(A) explains the reduction in cycle time achieved with making use of the high-speed curve-generating process of the present invention, in which the rotating velocity of the work spindle 14 varies so as to get the slider 12 moving at a preselected acceleration, increasing on a curved path, for example any curve of from second to forth degree, where changing rate of the rotating velocity of the work spindle 14 is made optimal. FIG. 1(B) explains the reduction in cycle time achieved with making use of the high-speed curve-generating process of the present invention, in which the rotating velocity of the work spindle 14 varies linearly with no changing rate so as to keep the acceleration of the slider 12 from exceeding the preselected acceleration. FIG. 1(C) shows the cycle time in the conventional curve generation, in which the work spindle 14 is driven at a preselected constant rotating velocity throughout the cutting operation while the travel amount the slider 12 gets less as the cutting operation proceeds inwards toward the center of the workpiece 9, so that the acceleration of the slider 12 is made lowered and therefore the cycle time is not shortened but remains at a status 1.

As seen in FIG. 1, the high-speed curve-generating process of the present invention, since making the acceleration of the slider 12 to be the standard for control, helps largely shorten the cycle time, compared with the conventional curve generation in which the rotating velocity of the work spindle 14 is kept constant throughout the cutting operation on the workpiece 9. Under the operating condition where the desired acceleration of the slider 12 is preset the top acceleration of the slider 12 or less, when the rotating velocity of the work spindle 14, for example, increases with a linear changing rate so as to keep the preset acceleration of the slider 12 as constant as possible, the cycle time needed to cut the desired surface on the workpiece 9 may be as shown in FIG. 1(B), shortened by a matter of from 30 to 40%. Under another operating condition where the desired acceleration of the slider 12 is preset the top acceleration of the slider 12, as an alternative, if the rotating velocity of the work spindle 14 is changed to increase in conformity to a curved path where the changing rate of the rotating velocity of the work spindle 14 is made optimal so as to keep the preset acceleration of the slider 12 as constant as possible, the cycle time needed to cut the desired surface on the workpiece 9 may be as shown in FIG. 1(A), shortened by a matter of 50%. When the rotating velocity of the work spindle 14 increases, for example, with the changing rate conforming to the curve where the rotating velocity of the work spindle 14 is made optimal, the meridians RB and perpendicular meridians RC made on the workpiece would be ensured extending in parallel from the start to near the end of the cutting operation. Nevertheless, because the rotational frequency of the workpiece 9 would get much great at the center thereof, the acceleration of the cutting tool 15 has to be varied, taking into account an upper limit for the rotational frequency of the work spindle 14, as the cutting tool 15 proceeds away from the circumferential fringe toward the center of the workpiece 9. With the high-speed cure-generating process of the present invention, moreover, the procedure to machine the curved surface on the workpiece 9 can be performed by making use of a prediction learning control system taking into account pseudo-instructions which are applied repeatedly to the work spindle 14 at every a fixed periodic angle or angular cycle, whereby the desired curved surface is generated with accuracy on the workpiece 9.

Figure 7:
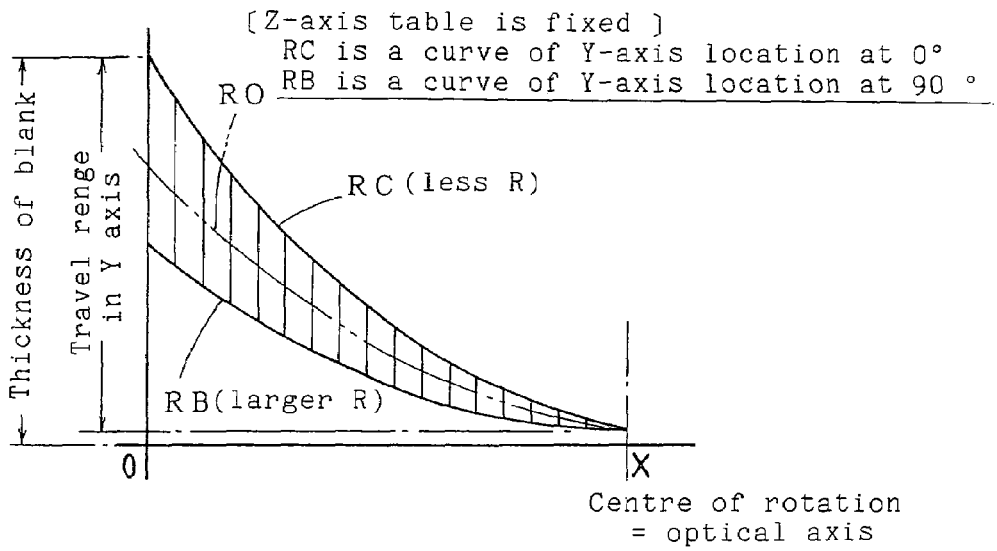
FIG. 7 is a graphic representation explaining the relation between a Z-axis movement and a Y-axis movement in the high-speed curve-generating process of the present invention.
Figure 7:
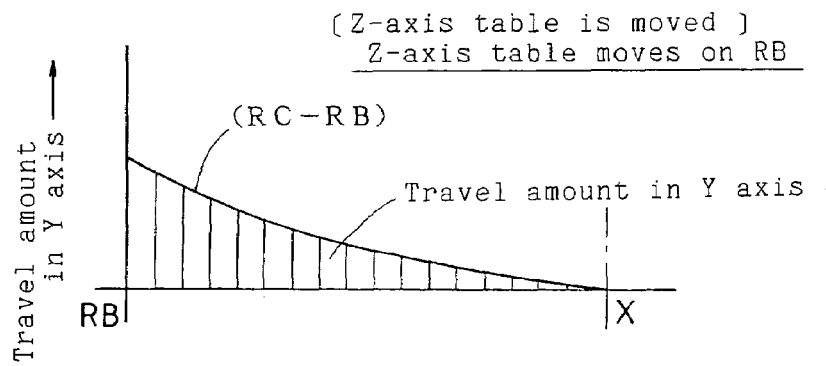
Figure 7:
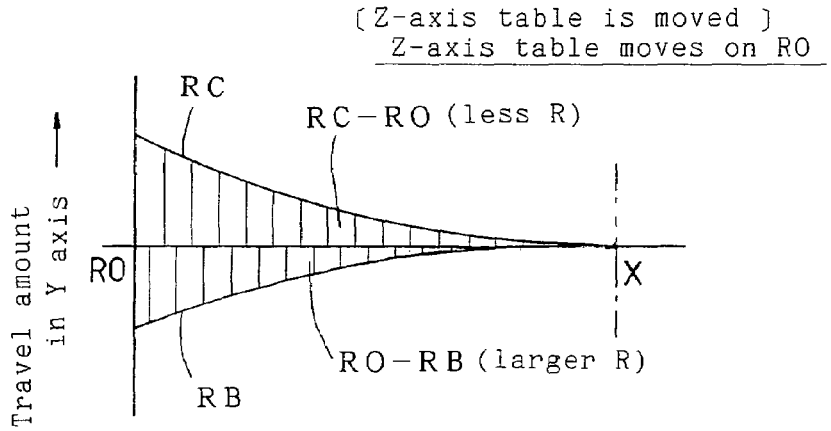

Further referring to FIG. 7, there is explained a difference in travel amount of the slider 12 between one cutting condition where the work spindle 14 is kept against the movement in the Z-axis direction and another cutting condition where the work spindle 14 is forced in the Z axis in synchronized relation with both the rotation thereof and the Y-axis movement of the slider 12. Here for the sake of simplifying the explanation, although assuming that the rotating velocity of the work spindle 14 is kept constant while the acceleration of the slider 12 experiences any change with the work spindle 14 being driven at a preselected rotational frequency, it will be appreciated that the control system to get the work spindle 14 forcing in the Z-axis direction may be applicable in such operating condition that the slider 12 is set to a preselected acceleration while the work spindle 14 is made variable in rotating velocity, which is thus varied so as to keep the slider 12 constant in the acceleration thereof in the Y axis.

The high-speed curve-generating process discussed here features that the rotation of the work spindle 14 and the movements of the slider 12 and the X-axis table 4 are brought into synchronized relation one another to get the slider 12 and the X-axis table 4 moving in and out in the Y axis and Z axis, respectively, in synchronization with both the rotation and the movement in the Z axis of the work spindle 14, thereby cutting the surface 31 of the workpiece 9 perpendicular to the moving direction of the cutting tool 15 into a desired curved surface of the predetermined curvature. For generating any curved surface including the toric surface and the like on the surface 31 of the workpiece 9, or a lens surface of a lens blank, with making use of the high-speed curve-generating process of the present invention, a stroke of reciprocation in the Y-axis direction of the slider 12 to which the cutting tool 15 is fastened is set to a value found by taking away a stroke in Z-axis direction of the work spindle 14 on which the workpiece 9 is held.

FIG. 7 is a graphic representation explaining the relation between a Z-axis movement and a Y-axis movement in the high-speed curve-generating process of the present invention. In FIG. 7(A), the ordinate represents the thickness of a lens while the abscissa is the radius of a lens and the sign X is the optical axis, which corresponds with its axis of rotation. FIG. 7(A) explains the working condition where the Z-axis table 3 is kept against the movement thereof in the Z-axis direction while FIG. 7(B) is the working condition where the Z-axis table 3 is moved in the Z-axis direction to describe a RB locus. In FIG. 7(C), the curve RO lying midway between RC and RB in FIG. 7(A) is shown made into a straight line. Shadow areas in FIG. 7(A) and (B) represent the travel amount of the slider 12 in the Y-axis direction, while the same area in FIG. 7(C) is the travel amount of the slider 12 in the Y-axis direction after the Z-axis table has been moved following the RO locus.

Now considering that the high-speed curve-generating process of the present invention is used to make any one surface on the workpiece 9 of plastic lens into a toric surface where a curvature RB in one meridian has a radius RL while another curvature RS in the perpendicular meridian has a radius RS less than the RL: RL>RS. When the Z-axis table is moved to make the lens surface of a curvature RB in the one meridian as in FIG. 7(A), the travel amount in the Y-axis direction of the slider 12 on which the cutting tool 15 is mounted is determined by the difference between the travel amount RC corresponding to the radius RS of the curvature in the perpendicular meridian and the travel amount RB corresponding to the radius RL of the curvature in the one meridian: (RC−RB). Thus, the travel amount of the cutting tool 15 mounted on the slider 12 will be referred to as the difference between the travel mount, for example RC of the slider 12 on which the cutting tool 15 and the travel amount, for example RB of the work spindle 14 on which the workpiece 9 is mounted. This means that the travel amount, or (RC−RB), of the cutting tool 15 needed for generating the desired lens surface on the workpiece 9 can be made less compared with the operating condition where the Z-axis table 3 is kept against movement.

One of most popular applications of the generation of any predetermined desired curvature on the surface 31 of the workpiece 9 is a spectacle lens on which concave lens surface, convex lens surface, toric lens surface, progressive multifocal lens surface, compound lens surface, and so on are made using the cutting tool 15, and the generation of the desired curvature of the surface can be accomplished by the prediction learning control and learning control system taking into account instructions which are applied repeatedly.

With the NC curve generator 1, the X-axis table 4 is arranged in opposition to the workpiece 9 in a way lying perpendicular to the Z-axis table 3 to be forced using a servomotor 10 to move in and out in the X-axis direction. The turner 11 mounted on the X-axis table 4 is comprised of a turner base 16 mounted on a slider base 13, which is fastened to the X-axis table 4 with the use of a stud 35, the slider 12 lying on the turner base 16 for reciprocation in the Y-axis direction parallel with the Z-axis direction, and the driving means of either the linear motor 18 or the rotary servomotor to actuate the slider 12 to move in and out in the Y-axis direction. The slider 12 is provided at the foremost end thereof with the tool holder 28 on which the cutting tool 15 is held. With the embodiment illustrated in FIGS. 3 to 5, the driving means is made of the linear motor 18, which is built in the turner 11 mounted on the slider base 13 lying on the X-axis table 4. The slider 12 is provided at the underneath thereof with a carriage 33, which fits in a track section 17 for linear sliding movement relative to the track section 17 to allow the slider 12 to move in and out in the Z-axis direction.

In preparation for producing the curved surface cut on the surface 31 of the workpiece 9 with the use of the cutting tool 15, the workpiece 9 is mounted in the chuck 8 at the foremost end of the work spindle, or a C axis, on the headstock 5. The workpiece 9 is turned around the centre C axis of the work spindle 14 with the spindle motor at a rotating velocity of, for example 300 rpm or more. The workpiece 9 is preferably of plastics or non-metallic materials. Actuation of the servomotor 6 gets the work spindle 14 on which the workpiece 9 is mounted moving in and out in the Z-axis direction in synchronized relation with the rotation of the work spindle 14, while the cutting tool 15 held on the slider 12 makes reciprocation in the Z-axis direction as the slider 12 is forced to move in and out, and at the same time also makes reciprocation in the X-axis direction together with the X-axis table 4. With the NC curve generator 1 constructed as stated earlier, the slider 12 weighs less and the X-axis table 4 having mounted the turner 11 thereon is made considerably less in mass, so that the inertia of them gets less, making sure of the reciprocation with high acceleration.

The NC curve generator 1 performs generating the desired curved surface on the workpiece 9 by controlling the servomotor 10 in terms of numerical date, which actuates the spindle motor 7 for driving the work spindle 14 and also forces the X-axis table 4 to move in and out. A rotary encoder high in resolving power measures Angle of rotation varying by the minute constantly. The travel amount of the cutting tool 15 caused by the reciprocation of the slider 12, which is actuated by the linear motor 18, also experiences actually any changing by the minute. Such real travel amount of the cutting tool 15 is sensed continuously by a linear scale 21 installed in the linear motor 18, followed by compared with stored information in a numerical control (NC) system. The resultant comparison information is served on the servomotors 6, 10, linear motor 18 and the spindle motor 7 to control them. Location of the X-axis table 4 is also sensed with a pulse coder to control the servomotor 10 for the X-axis table through the NC system.

The NC curve generator 1 has the turner 11 designed to withstand against high speed and high acceleration, on which the cutting tool 15 is mounted to generate the lens surface on the plastic lens blank. The slider 12 is controlled so as to synchronize with the rotation of the work spindle 14 and at the same time move in and out in synchronization with both the reciprocations of the Z-axis table 3 and X-axis table 4. The slider 12 is also controlled by following the data input from the outside, making the reciprocation with high speed and high acceleration, thereby getting the cutting tool 15 cutting the surface 31, such as lens surface and the like, on the workpiece 9 into the desired curved surface with high speed and high acceleration.

The turner 11 is composed of the turner base that is made up of a pair of turner base members 16A, 16B each of which has a lengthwise recess 40A, 40B, and the slider 12 lying on the turner base 16 for reciprocation. With the turner base 16, the turner base members 16A, 16B are disposed side by side on the slider base 13 with their lengthwise recesses 40A, 40B being in opposition to one another. On assembly of the turner base 16 with the slider base 13, any one turner base member 16A lies in abutment against a shoulder 27 raised above the slider base 13 while another turner base member 16B is placed in such away coming into abutment at a lengthwise side 41B thereof against a mating side 41A of the counterpart, or the turner base member 16A, and kept against widthwise movement by using a sidewise retainer 26 fastened to the slider base 13.

After the turner base members 16A, 16B has been fastened on the slider base 13 with their lengthwise recesses 40A, 40B being in opposition to one another, a lengthwise space 42 where the slider 12 is allowed to fit for movement in there is made open between the recesses 40A, 40B opposing one another. A lid 24 is placed on the turner base members 16A, 16B to close the space 42 from above. The slider 12 is accommodated in the space 42 inside the turner base 16 for reciprocation in the Z-axis direction. The slider 12 juts out from the forward end of the space 42, having at the tip thereof a tool mount 45 on which the tool holder 28 is mounted. The cutting tools 15 are set to the tool holder 28 in an exchangeable manner. As an alternative, the cutting tool 15 may be held in the tool holder 28, which is mounted directly on the slider 12.

With the NC curve generator 1, the linear motor 18 is adopted for the driving means to get the slider 12 moving in and out relative to the turner base 16 in the Y-axis direction, which is identical with the Z-axis direction. The linear motor 18 in the embodiment discussed here to force the slider 12 to move in and out is a magnet-moving type linear motor, which is composed of a linear motor winding 19 of an armature coil fastened to the turner base 16, and a linear motor magnet piece 20 of a field magnet installed on the slider 12. As an alternative, it will be appreciated that the linear motor 18 may be made of a coil-moving type linear motor in which the armature coil is allowed to move. On the turner base 16, there are fastened more than one track section 17 arranged to provide the linear guideway lying in the Y-axis direction, or the Z-axis direction, perpendicular to the X-axis direction. The slider 12 is provided at the underneath thereof with the carriage 33, which fits in the track section 17 for linear sliding movement along the track section 17 on the turner base 16 to allow the slider 12 to move in and out with high speed and high acceleration.

Combination of the linear scale 21 extending along the linear motor winding 19 and a linear scale sensor 22 is provided to monitor a reciprocating range, or stroke, of the slider 12. The travel amount of the slider 12 relative to the turner base 16 is found instantly with the linear scale sensor 22. Information as to the sensed travel amount of the slider 12 is fed back to the control system where the information is reflected to an ensuring control of the movement of the slider 12 through the learning control function and the prediction learning control function. Moreover, a scale liner 39 to identify the location of the linear scale 21 is arranged between the turner base 16 and the linear scale 21. The control system helps the cutting tool 15 on the slider 12 cut the surface 31 of the workpiece 9, or the surface 31 of the lens blank, in terms of the predetermined machining command value into the desired curved surface. To this end, the control system includes the learning control function or the prediction learning control, which functions to bring any difference between cutting information and cutting command value closer to zero to make for the subsequent cutting procedure against the workpiece 9.

There is provided a cold plate 23 on the turner base 16 to cool down the linear motor winding 19. Whenever the magnetic piece 20 moves across the magnetic force as the slider 12 moves in and out, the linear motor winding 19 generates heat, rising in temperature. To prevent overheating in the linear motor winding 19, the turner base 16 is provided with a cold plate 23 to remove heat from the linear motor winding 19. A fixed block 32 of reference is secured to the X-axis table 3 to adjust the parallelism of the turner axis of the slider base 13 with the Z axis of the Z-axis table 3. Adjustment of the slider base 13 relative to the fixed block 32 of reference to keep the turner axis parallel to the Z axis can be performed by manipulation of adjust screws 37 associated with an adjuster block 36, which is attached to the slider base 13. Between the turner base 16 and the track section 17, moreover, there is provided a liner 38 for linear movement to measure the travel range of the slider 12 relative to the turner base 16. Stoppers 29, 30 are installed at forward and aft ends of the turner base 16, one to each end, to limit the stroke of the slider 12 while abutments 34 are made on the slider 12 to come into engagement with their associated stoppers 29, 30 to define the travel range of the slider 12. Lines including power lines for the driving means, signal wirings, coolant supply lines for the turner, lubricant supply lines, and so on are protected with a guide cover, shrouding member or the like, which is easy to bend as the slider 12 move in and out.

As the present invention may be embodied in several forms without departing from the spirit of essential characteristics thereof, the present embodiments are therefore illustrative and not restrictive, since the scope of the invention is defined by the appended claims rather than by the description preceding them, and all changes that fall within meets and bounds are therefore intended to embraced by the claims.

What is claimed is:

1. A process for generating with high speed a curved surface on a workpiece, using a numerical control (NC) processor comprising;
a work spindle to hold a workpiece thereon, the work spindle being supported for rotation on a headstock, a Z-axis table allowing the work spindle to move in reciprocation in a Z-axis direction, an X-axis table arranged in opposition to the work spindle in a way allowed to move in reciprocation in an X-axis direction perpendicular to the Z-axis direction, a turner base fastened to the X-axis table, a slider allowed to move back and forth over the turner base in a Y-axis direction parallel with the Z-axis direction, a cutting tool mounted to the slider, and a driving means to force the slider in reciprocation in the Y-axis direction;
wherein with an acceleration of the slider in reciprocation set at its highest acceleration, a rotating velocity of the work spindle is varied as the slider is made to continue reciprocation at its highest acceleration while moving across the workpiece, and movements of the slider in the Y-axis direction and the X-axis table in the X-axis direction are synchronized with the varied rotating velocity of the work spindle, whereby the cutting tool generates predetermined curved surface on a surface of the workpiece lying perpendicular to the Y-axis direction of the cutting tool.

2. A process for generating with high speed curved surface on a workpiece, as set forth in claim 1, wherein the driving means is a linear motor.

3. A process for generating with high speed a curved surface on a workpiece, as set forth in claim 1, wherein the Z-axis table on which the work spindle is mounted is moved in the Z-axis direction throughout cutting operation with the cutting tool into the workpiece, and the movement of the Z-axis table in the Z-axis direction is made synchronized one another with the varied rotating velocity of the work spindle, the movement of the slider in the Y-axis direction and the movement of the X-axis table in the X-axis direction.

4. A process for generating with high speed a curved surface on a workpiece, as set forth in claim 1, wherein procedure to cut the desired curved surface on the workpiece is performed by making use of a prediction learning control and a learning control where angle pulses are used at repeated periods with taking into account instructions which are fed back repeatedly to the work spindle at every angular cycle.

5. A process for generating with high speed a curved surface on a workpiece, as set forth in claim 1, wherein a stroke of reciprocation in the Y-axis direction of the slider to which the cutting tool is mounted is set to a value found by taking away a stroke in Z-axis direction of the work spindle on which the workpiece is held, whereby the workpiece is cut into the desired curved surface.

6. A process for generating with high speed a curved surface on a workpiece, as set forth in claim 1, wherein the desired cut surface on the workpiece is a toric surface where a curvature in one meridian has a radius while another curvature in a perpendicular meridian has another radius, and wherein a travel amount in the Z-axis direction of the work spindle on which the workpiece is held is set to a travel amount corresponding to the radius of curvature in one meridian while a travel amount in the Y-axis direction of the slider on which the cutting tool is mounted is set to a difference between a travel amount corresponding to the radius of curvature in the perpendicular meridian and a travel amount corresponding to the radius of curvature in the one meridian.

7. A process for generating with high speed a curved surface on a workpiece, as set forth in claim 1, wherein the workpiece on which the desired curved surface is generated is a spectacle lens.

8. A process for generating with high speed a curved surface on a workpiece, as set forth in claim 1, wherein the slider makes N times of reciprocation every one rotation of the work spindle.

9. A process for generating with high speed a curved surface on a workpiece, as set forth in claim 2, wherein the linear motor to force the slider to move in and out is comprised of a field magnet associated with any one of the slider and the turner base, and an armature winding associated with the other.

* * * * *